United States Patent
Lee et al.

(10) Patent No.: US 8,514,975 B2
(45) Date of Patent: Aug. 20, 2013

(54) METHOD AND APPARATUS FOR TRANSMITTING REFERENCE SIGNAL IN WIRELESS COMMUNICATION SYSTEM

(75) Inventors: Moon Il Lee, Gyeongki-do (KR); Seung Hee Han, Gyeongki-do (KR); Jae Hoon Chung, Gyeongki-do (KR); Hyun Soo Ko, Gyeongki-do (KR); Bin Chul Ihm, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 232 days.

(21) Appl. No.: 13/059,831

(22) PCT Filed: Aug. 21, 2009

(86) PCT No.: PCT/KR2009/004659
§ 371 (c)(1),
(2), (4) Date: Feb. 18, 2011

(87) PCT Pub. No.: WO2010/021510
PCT Pub. Date: Feb. 25, 2010

(65) Prior Publication Data
US 2011/0170629 A1    Jul. 14, 2011

Related U.S. Application Data

(60) Provisional application No. 61/090,619, filed on Aug. 21, 2008.

(30) Foreign Application Priority Data

Dec. 22, 2008    (KR) .................. 10-2008-0130807

(51) Int. Cl.
*H04L 27/00*    (2006.01)

(52) U.S. Cl.
USPC ........... 375/299; 341/180; 375/260; 375/267; 375/347

(58) Field of Classification Search
None
See application file for complete search history.

(56) References Cited

U.S. PATENT DOCUMENTS

| | | | | |
|---|---|---|---|---|
| 2008/0200196 | A1* | 8/2008 | Muharemovic et al. | 455/512 |
| 2009/0304102 | A1* | 12/2009 | Yonge et al. | 375/260 |
| 2010/0316156 | A1* | 12/2010 | Higuchi et al. | 375/267 |
| 2012/0099668 | A1* | 4/2012 | Sakata et al. | 375/267 |
| 2012/0213300 | A1* | 8/2012 | Yamaura | 375/260 |

FOREIGN PATENT DOCUMENTS
WO    2008/072899    6/2008

OTHER PUBLICATIONS
International Search Report from PCT/KR2009/004659.

* cited by examiner

*Primary Examiner* — Adolf Dsouza
(74) *Attorney, Agent, or Firm* — Morgan, Lewis & Bockius LLP

(57) ABSTRACT

A method and an apparatus for transmitting a reference signal in a wireless communication system are provided. The method includes generating a first sequence and a second sequence, mapping the first sequence to reference symbols in a resource block, mapping the second sequence to the same reference symbols in the resource block, and transmitting a first reference signal (RS) based on the first sequence through a first antenna, and a second RS based on the second sequence through a second antenna.

8 Claims, 12 Drawing Sheets

Antenna 0

METHOD AND APPARATUS FOR TRANSMITTING REFERENCE SIGNAL IN WIRELESS COMMUNICATION SYSTEM

The present application is a national stage of PCT International Application No. PCT/KR2009/004659, filed Aug. 21, 2009, and claims the benefit of U.S. Provisional Application No. 61/090,619, filed Aug. 21, 2008. The present national stage application also claims the benefit of Korean Patent Application No. 10-2008-0130807, filed Dec. 22, 2008.

TECHNICAL FIELD

The present invention relates to wireless communications, and more particularly, to a method and an apparatus for transmitting a reference signal in a wireless communication system.

BACKGROUND ART

In next generation multimedia mobile communication systems, which have been actively studied in recent years, there is a demand for a system capable of processing and transmitting a variety of information (e.g., video and radio data) in addition to the early-stage voice service. 3rd generation wireless communication is followed by a 4th generation wireless communication which is currently being developed aiming at support of a high-speed data service of 1 gigabits per second (Gbps) in downlink and 500 megabits per second (Mbps) in uplink. Wireless communication systems are designed for the purpose of providing reliable communication to a plurality of users irrespective of users' locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

Orthogonal Frequency Division Multiplexing (OFDM), Multiple Input Multiple Output (MIMO), etc., are techniques for supporting reliable high-speed data services.

An OFDM system capable of reducing an inter-symbol interference effect with a low complexity is taken into consideration as one of post-3rd generation wireless communication systems. In the OFDM, a serially input data symbol is converted into N parallel data symbols (where N is a natural number), and is then transmitted by being carried on N separate subcarriers. The subcarriers maintain orthogonality in a frequency dimension. In a mobile communication market, a standard is expected to be changed from a conventional code division multiple access (CDMA) system to an OFDM-based system.

The MIMO technique improves data transmission/reception efficiency by using multiple transmit (Tx) antennas and multiple receive (Rx) antennas. Examples of the MIMO technique include spatial multiplexing, transmit diversity, beamforming, etc. A MIMO channel matrix depending on the number of Rx antennas and the number of Tx antennas can be decomposed into a plurality of independent channels. Each independent channel is referred to as a layer or a stream. The number of layers is referred to as a rank.

For the purpose of data transmission/reception, system synchronization acquisition, channel information feedback, etc., there is a need to estimate an uplink channel or a downlink channel in a wireless communication system. Channel estimation is a process of recovering a Tx signal by compensating for signal distortion in an environment where a rapid change occurs due to fading. In general, channel estimation requires a reference signal known to both a transmitter and a receiver. The reference signal is also referred to as a pilot.

In the OFDM system, reference signals may be allocated by using two methods, i.e., a first method in which the reference signals are allocated to all subcarriers and a second method in which the reference signals are allocated between data subcarriers. The first method uses a signal (e.g., a preamble signal) consisting of only reference signals. The first method has a significantly improved channel estimation performance in comparison with the second method, but has a decreased data transmission rate. Therefore, the second method can be used to increase the data transmission rate. The second method may result in deterioration of the channel estimation performance since density of the reference signals is decreased. Therefore, it is required that the reference signals are properly arranged to minimize the deterioration of the channel estimation performance.

If the transmitter transmits a reference signal p and the receiver receives an Rx signal y, the Rx signal y can be expressed by the following equation.

MathFigure 1

$$y = h \cdot p + n \qquad \text{[Math.1]}$$

Herein, h denotes a channel on which the reference signal is transmitted, and n denotes thermal noise generated in the receiver.

In this case, the reference signal p is known to the receiver. The receiver can estimate the channel by using the reference signal p. The estimated channel h' can be expressed by the following equation.

MathFigure 2

$$h' = y/p = h + n/p = h + n' \qquad \text{[Math.2]}$$

Accuracy of the estimated channel h' is determined according to n'. For the accuracy of the estimated channel h', n' has to converge to zero. Channel estimation may be performed by using a large number of reference signals to minimize an influence of n'. The receiver can compensate for the estimated channel to recover data transmitted by the transmitter.

Since antennas of a multiple antenna system respectively correspond to different channels, each antenna has to be considered in the designing of a reference signal structure. Therefore, the reference signal structure of the multiple antenna system may have a significantly large reference signal overhead. The reference signal overhead can be defined as a ratio of the number of subcarriers for transmitting the reference signal to the number of all subcarriers. If the reference signal overhead is great, there is a problem in that the number of data subcarriers for transmitting data in practice is decreased. This results in decrease in a data processing load and deterioration in spectrum efficiency. As a result, an overall system performance may deteriorate.

Accordingly, there is a need for a method and an apparatus for effectively transmitting a reference signal in a multiple antenna system.

DISCLOSURE OF INVENTION

Technical Problem

The present invention provides a method and an apparatus for transmitting a reference signal in a wireless communication system.

Solution to Problem

In an aspect, a method for transmitting a reference signal in a wireless communication system, carried in a transmitter, is provided. The method includes generating a first sequence and a second sequence, mapping the first sequence to reference symbols in a resource block, mapping the second sequence to the same reference symbols in the resource block, and transmitting a first reference signal (RS) based on the first sequence through a first antenna, and a second RS based on the second sequence through a second antenna, wherein the resource block consists of a plurality of orthogonal frequency division multiplexing (OFDM) symbols and a plurality of subcarriers, each element of the resource block is a resource element, and the reference symbols are resource elements of a specific position in the resource block.

In another aspect, a transmitter is provided. The transmitter includes a first antenna, a second antenna, and a reference signal generator coupled with the first antenna and the second antenna and configured to generate a first sequence and a second sequence, map the first sequence to reference symbols in a resource block, map the second sequence to the same reference symbols in the resource block, and transmit a first RS based on the first sequence through the first antenna and a second RS based on the second sequence through the second antenna.

Advantageous Effects of Invention

A method and an apparatus for effectively transmitting a reference signal in a wireless communication system are provided.

MODE FOR THE INVENTION

Figure 1:
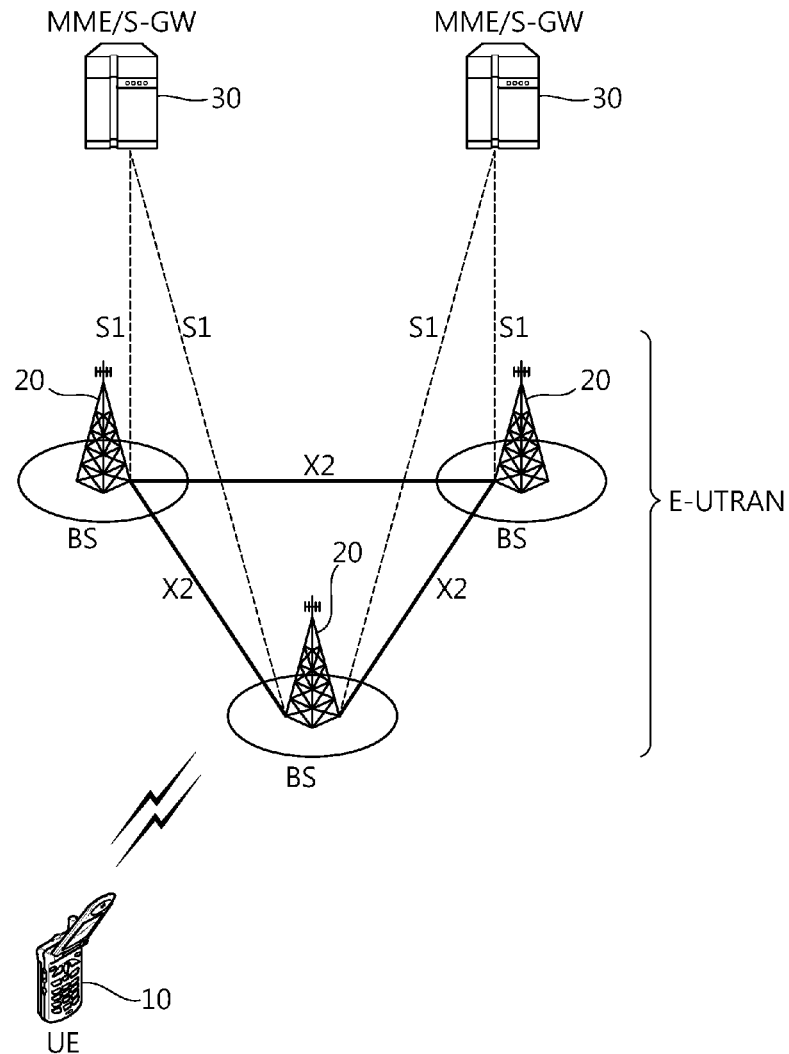
FIG. 1 is a block diagram showing a wireless communication system.

FIG. 1 is a block diagram showing a wireless communication system. This may be a network structure of a 3rd generation partnership project (3GPP) long term evolution (LTE)/LTE-advanced (LTE-A). The LTE may be also referred to as an evolved-universal mobile telecommunications system (E-UMTS). The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 providing a user plane and a control plane towards a user equipment (UE) 10.

The UE 10 may be fixed or mobile, and may be referred to as another terminology, such as a mobile station (MS), a user terminal (UT), a subscriber station (SS), a mobile terminal (MT), a wireless device, etc. The BS 20 may be a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. The BSs 20 are interconnected with each other by means of an X2 interface. The BSs 20 are also connected by means of an S1 interface to an evolved packet core (EPC), more specifically, to the mobility management entity (MME) by means of the S1-MME and to the serving gateway (S-GW) 30 by means of the S1-U. The S1 interface supports a many-to-many relation between the BS 20 and the MME/S-GW 30.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

The UE belongs to one cell. The cell to which the UE belongs is referred to as a serving cell. The BS which provides the serving cell with a communication service is referred to as a serving BS. The wireless communication system is a cellular system in which another cell is adjacent to the serving cell. The adjacent another cell is referred to as a neighbor cell.

Layers of a radio interface protocol between the UE and the network can be classified into a first layer (L1), a second layer (L2), and a third layer (L3) based on the lower three layers of the open system interconnection (OSI) model that is well-known in the communication system. The first layer is a physical (PHY) layer. The second layer can be divided into a medium access control (MAC) layer, a radio link control (RLC) layer, and a packet data convergence protocol (PDCP) layer. The third layer is a radio resource control (RRC) layer.

Figure 2:
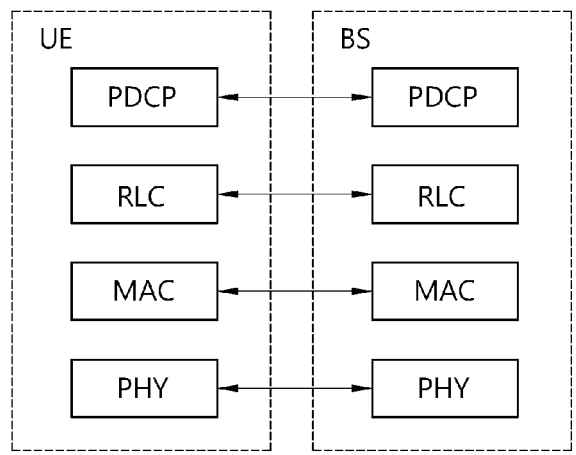
FIG. 2 is a block diagram showing a radio protocol architecture for a user plane.
Figure 3:
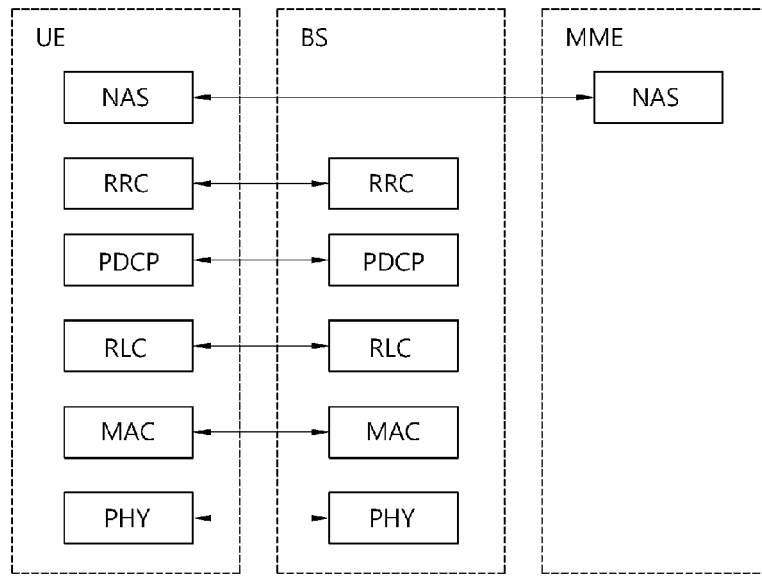
FIG. 3 is a block diagram showing a radio protocol architecture for a control plane.

FIG. 2 is a block diagram showing a radio protocol architecture for a user plane. FIG. 3 is a block diagram showing a radio protocol architecture for a control plane. They illustrate the architecture of a radio interface protocol between the UE and the E-UTRAN. The user plane is a protocol stack for user data transmission. The control plane is a protocol stack for control signal transmission.

Referring to FIGS. 2 and 3, between different PHY layers (i.e., a PHY layer of a transmitter and a PHY layer of a receiver), information is carried through a physical channel. The PHY layer is coupled with a MAC layer, i.e., an upper layer of the PHY layer, through a transport channel. Data is transferred between the MAC layer and the PHY layer through the transport channel. The PHY layer provides the MAC layer and upper layers with information transfer services through the transport channel.

The MAC layer provides services to an RLC layer, i.e., an upper layer of the MAC layer, through a logical channel. The RLC layer supports reliable data transmission. The PDCP layer performs a header compression function to reduce a header size of an Internet protocol (IP) packet.

An RRC layer is defined only in the control plane. The RRC layer controls radio resources between the UE and the network. For this, in the RRC layer, RRC messages are exchanged between the UE and the network. The RRC layer serves to control the logical channel, the transport channel, and the physical channel in association with configuration, reconfiguration and release of radio bearers (RBs). An RB means a logical path provided by a first layer (i.e. PHY layer) and second layers (i.e. MAC layer, RLC layer and PDCP layer) for data transmission between the UE and the network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 4:
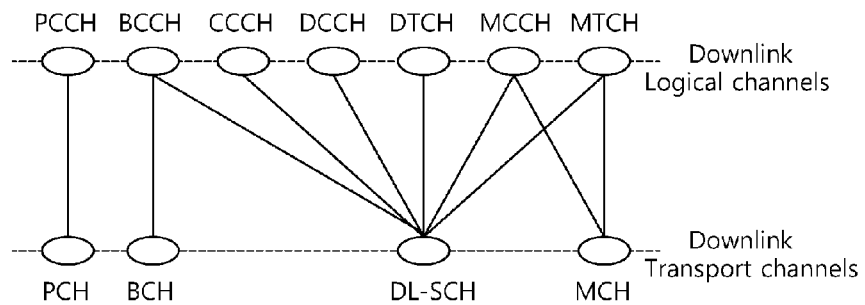
FIG. 4 shows mapping between a downlink logical channel and a downlink transport channel.

FIG. 4 shows mapping between a downlink logical channel and a downlink transport channel. The section 6.1.3.2 of 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8) may be incorporated herein by reference.

Referring to FIG. 4, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH).

A type of each logical channel is defined according to a type of information to be transmitted. The logical channel is classified into a control channel and a traffic channel.

The control channel is used to transmit control plane information. The BCCH is a downlink channel for broadcasting system control information. The PCCH is a downlink channel for transmitting paging information and is used when a network does not know a location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information. The MCCH is used by UEs that receive an MBMS. The DCCH is a point-to-point bi-directional channel for transmitting dedicated control information between the UE and the network, and is used by UEs having an RRC connection.

The traffic channel is used to transmit user plane information. The DTCH is a point-to-point channel for transmitting user information and exists in both uplink and downlink. The MTCH is a point-to-multipoint downlink channel for transmitting traffic data and is used by UEs that receive an MBMS.

The transport channels are classified by how and with what characteristics data are transferred over the radio interface. The BCH is broadcast in the entire coverage area of the cell and has a fixed, pre-defined transport format. The DL-SCH is characterized by support for hybrid automatic repeat request (HARM), support for dynamic link adaptation by varying modulation, coding, and transmit (Tx) power, possibility to be broadcast in the entire cell, and possibility to use beam-forming, support for both dynamic and semi-static resource assignment, support for UE discontinuous reception (DRX) to enable UE power saving, and support for MBMS transmission. The PCH is characterized by support for DRX to enable UE power saving and requirement to be broadcast in the entire coverage area of the cell. The MCH is characterized by support for requirement to be broadcast in the entire coverage area of the cell and support for an MBMS single frequency network (MBSFN).

Figure 5:
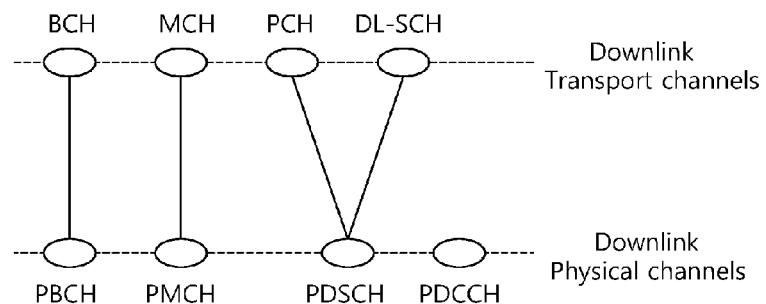
FIG. 5 shows mapping between a downlink transport channel and a downlink physical channel.

FIG. 5 shows mapping between a downlink transport channel and a downlink physical channel. The section 5.3.1 of 3GPP TS 36.300 V8.3.0 (2007-12) may be incorporated herein by reference.

Referring to FIG. 5, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH.

Several downlink physical control channels are used in a PHY layer. A physical downlink control channel (PDCCH) informs a UE of resource assignment of the PCH and DL-SCH, and also informs the UE of HARQ information related to the DL-SCH. The PDCCH may carry an uplink scheduling grant which informs the UE of resource assignment for uplink transmission. A physical control format indicator channel (PCFICH) informs the UE of the number of orthogonal frequency division multiplexing (OFDM) symbols used for transmission of the PDCCHs within a subframe. The PCFICH is transmitted in every subframe. A physical hybrid ARQ indicator channel (PHICH) carries HARQ acknowledgement (ACK)/negative-acknowledgement (NACK) in response to uplink transmission.

Figure 6:
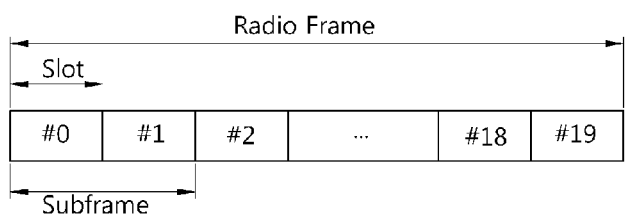
FIG. 6 shows a structure of a radio frame.

FIG. 6 shows a structure of a radio frame.

Referring to FIG. 6, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Figure 7:
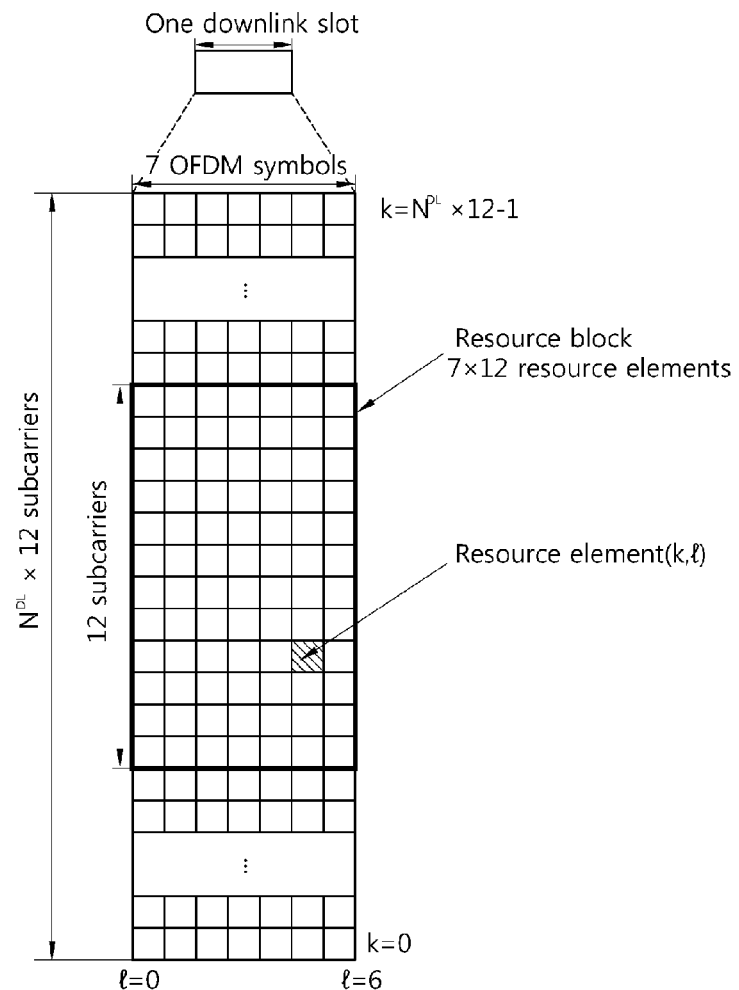
FIG. 7 shows an example of a resource grid for one downlink slot.

FIG. 7 shows an example of a resource grid for one downlink slot.

Referring to FIG. 7, the downlink slot includes a plurality of OFDM symbols in a time domain and $N^{DL}$ resource blocks (RBs) in a frequency domain. The OFDM symbol is for representing one symbol period. The OFDM symbol may also be referred to as an orthogonal frequency division multiple access (OFDMA) symbol, single carrier-frequency division multiple access (SC-FDMA) symbol, etc. in accordance with multiple access scheme. The number $N^{DL}$ of RBs included in the downlink slot depends on a downlink transmission bandwidth configured in a cell. For example, in a 3GPP LTE system, $N^{DL}$ may be any one value in the range of 60 to 110. One RB includes a plurality of subcarriers in the frequency domain.

Each element on the resource grid is referred to as a resource element. The resource element on the resource grid can be identified by an index pair (k, l) within the slot. Herein, $k(k=0, \ldots, N^{DL} \times 12-1)$ denotes a subcarrier index in the frequency domain, and $l(l=0, \ldots, 6)$ denotes an OFDM symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048. The structure of an uplink slot may be same as that of the downlink slot.

Figure 8:
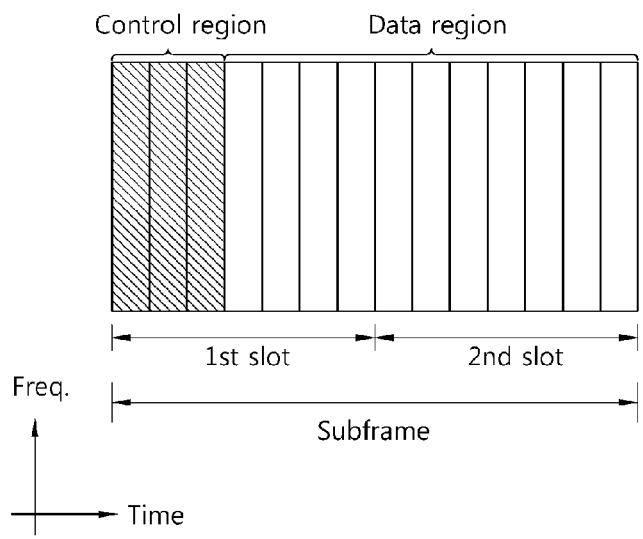
FIG. 8 shows a structure of a subframe.

FIG. 8 shows a structure of a subframe.

Referring to FIG. 8, the subframe includes two consecutive slots. A maximum of three OFDM symbols located in a front portion of a 1st slot within the subframe correspond to a control region. The remaining OFDM symbols correspond to a data region. Control channels such as a PCFICH, a PHICH, a PDCCH etc., can be assigned to the control region. A PDSCH can be assigned to the data region. A UE can read data information transmitted through the PDSCH by decoding control information transmitted through the PDCCH. Although the control region includes three OFDM symbols herein, this is for exemplary purposes only. The number of OFDM symbols included in the control region of the subframe can be known by using the PCFICH.

Hereinafter, a resource element used to transmit a reference signal (RS) is referred to as a reference symbol. Resource elements other than the reference symbol can be used for data transmission. A resource element used for data transmission is referred to as a data symbol.

An RS may be multiplied by a predetermined RS sequence if transmitted. For example, the RS sequence may be generated based on a pseudo-random (PN) sequence, an m-sequence, etc. The RS sequence may be generated based on a binary sequence or a complex sequence. If a BS transmits the RS multiplied by the RS sequence, interference of a reference signal received from a neighbor cell can be reduced and thus channel estimation performance can be improved in a UE.

An RS can be classified into a common RS and a dedicated RS. The common RS is an RS transmitted to all UEs in a cell. The dedicated RS is an RS transmitted to a specific UE in the cell or a specific UE group.

First, a common RS will be described.

Figure 9:
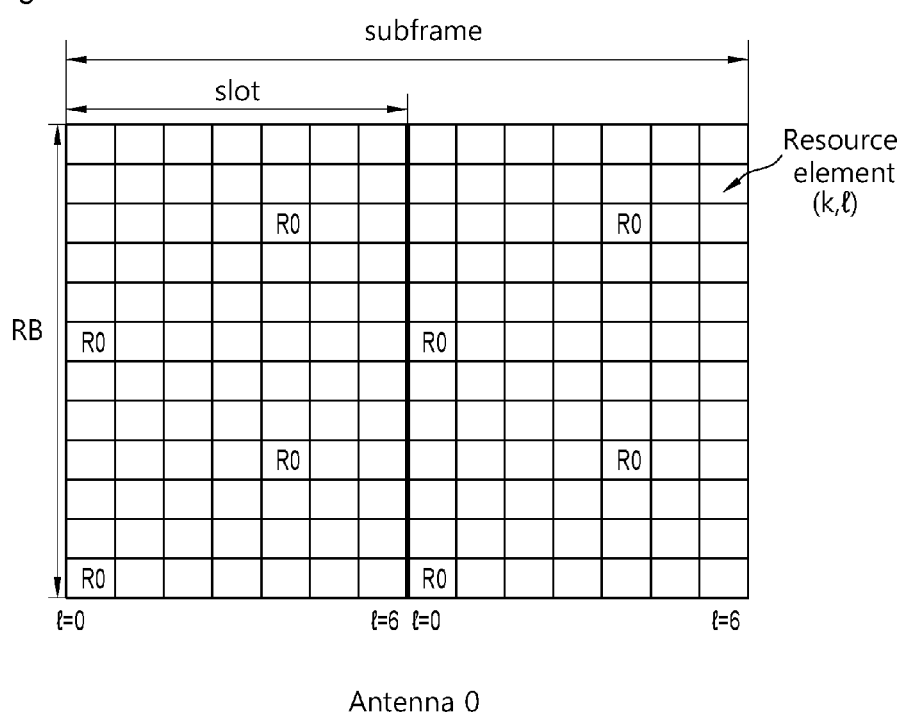
FIG. 9 shows an example of a common reference signal (RS) structure if a base station (BS) uses one antenna.
Figure 10:
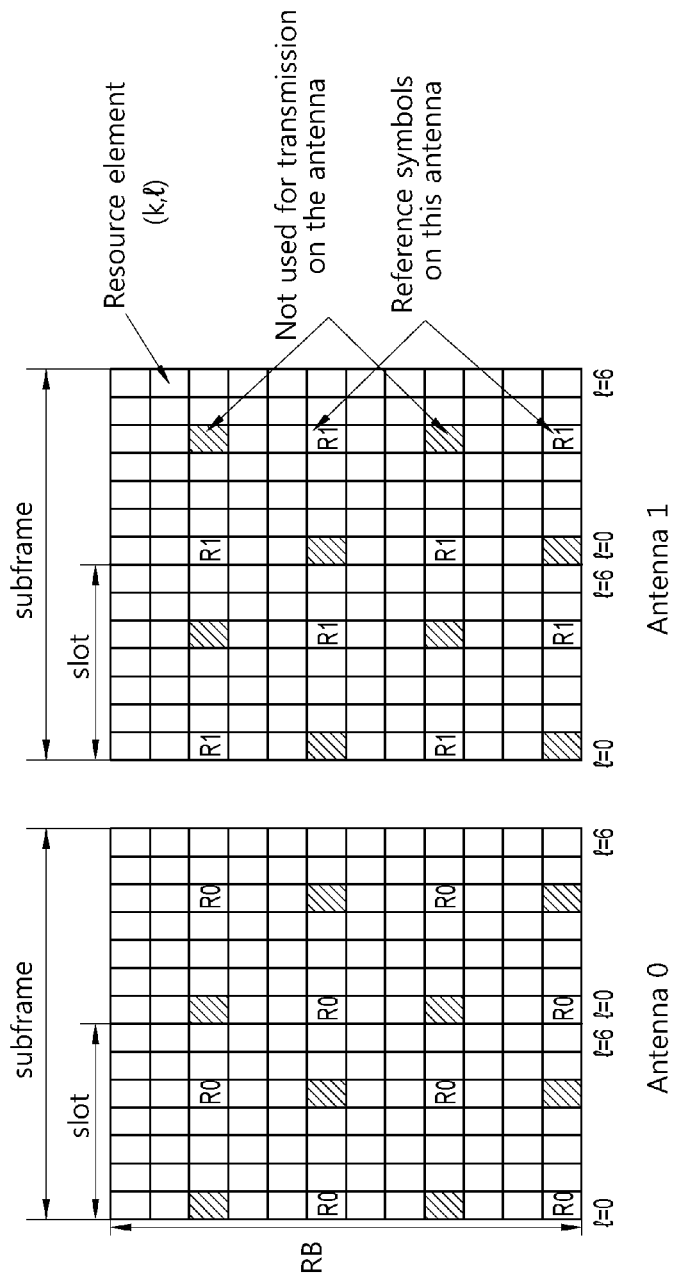
FIG. 10 shows an example of a common RS structure if a BS uses two antennas.
Figure 11:
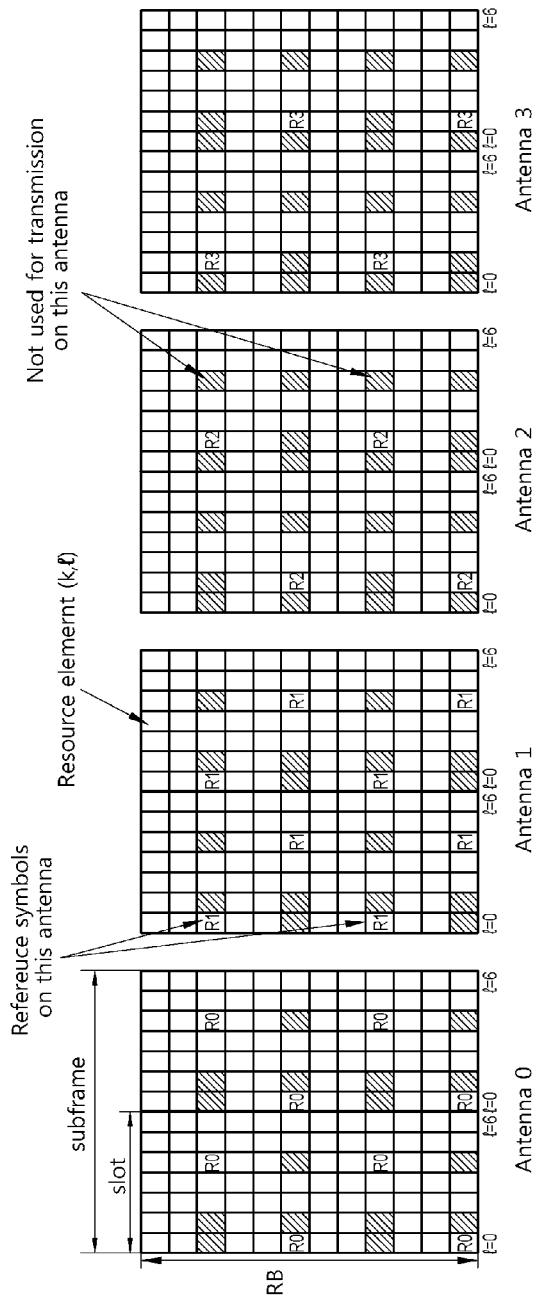
FIG. 11 shows an example of a common RS structure if a BS uses four antennas.

FIG. 9 shows an example of a common RS structure if a BS uses one antenna. FIG. 10 shows an example of a common RS structure if a BS uses two antennas. FIG. 11 shows an example of a common RS structure if a BS uses four antennas. The section 6.10.1 of the 3GPP TS 36.211 V8.2.0 (2008-03) Technical Specification Group Radio Access Network; Evolved Universal Terrestrial Radio Access (E-UTRA); Physical Channels and Modulation (Release 8) may be incorporated herein by reference.

Referring to FIG. 9 to FIG. 11, in multi-antenna transmission, a BS uses a plurality of antennas, there is one resource grid defined per antenna. One RS is transmitted per antenna. An RS for each antenna is transmitted by using reference symbols. Rp denotes a reference symbol of an antenna p (where, $p \in \{0, 1, 2, 3\}$). R0 to R3 do not overlap with one another. In one OFDM symbol, each Rp is located with a spacing of 6 subcarriers. In a subframe, the number of R0s is equal to the number of R1s, and the number of R2s is equal to the number of R3s. In the subframe, the number of R2s and R3s is less than the number of R0s and R1s. Rp is not used for any transmission on any other antennas except for the antenna p. This is to avoid interference between antennas.

The number of transmitted common RSs is always equal to the number of antennas irrespective of the number of streams. The common RS includes an independent RS for each antenna.

A frequency-domain position and a time-domain position of the common RS in a subframe are determined irrespective of the UEs. A common RS sequence to be multiplied by the common RS is generated also irrespective of the UEs. Therefore, all UEs within the cell can receive the common RS. A position of the common RS in a subframe and the common RS sequence may be determined according to a cell identifier (ID). Thus, the common RS is also referred to as a cell-specific RS.

More specifically, the time-domain position of the common RS in a subframe may be determined according to an antenna number and the number of OFDM symbols in a RB. The frequency-domain position of the common RS in the subframe may be determined according to an antenna number, a cell ID, an OFDM symbol index l, a slot number in a radio frame, etc.

The common RS sequence may be applied in one subframe on an OFDM symbol basis. The common RS sequence may vary according to a cell ID, a slot number in one radio frame, an OFDM symbol index in a slot, a CP length, etc.

Referring to FIG. 9 to FIG. 11, in an OFDM symbol including reference symbols, the number of reference symbols for each antenna is 2. Since a subframe includes $N^{DL}$ RBs in the frequency domain, the number of reference symbols for each antenna is $2 \times N^{DL}$ in one OFDM symbol. Thus, a common RS sequence has a length of $2 \times N^{DL}$.

If r(m) denotes a common RS sequence, the following equation shows an example of a complex sequence used as r(m).

MathFigure 3

$$r(m) = \frac{1}{\sqrt{2}}(1 - 2 \cdot c(2m)) + j\frac{1}{\sqrt{2}}(1 - 2 \cdot c(2m+1)) \quad \text{[Math. 3]}$$

Herein, m is $0, 1, \ldots, 2N^{max,DL}-1$. $N^{max,DL}$ denotes the number of RBs corresponding to a maximum bandwidth. For example, in the 3GPP LTE system, $N^{max,DL}$ is 110. c(i) is a PN sequence and can be defined by a Gold sequence having a length of 31. The following equation shows an example of a sequence c(i) having a length of $2 \times N^{max,DL}$.

MathFigure 4

$$c(n)=(x_1(n+N_c)+x_2(n+N_c)) \bmod 2$$
$$x_1(n+31)=(x_1(n+3)+x_1(n)) \bmod 2$$
$$x_2(n+31)=(x_2(n+3)+x_2(n+2)+x_1(n+1)+x_1(n)) \bmod 2 \quad [\text{Math.4}]$$

Herein, $N_C$ is 1600, $x_1(i)$ denotes a 1st m-sequence, and $x_2(i)$ denotes a 2nd m-sequence. For example, the 1st m-sequence can be initialized with $x_1(0)=1$, $x_1(n)=0(n=1, 2, \ldots, 30)$ at the start of each OFDM symbol. The 2nd m-sequence can be initialized according to a cell ID, a slot number in one radio frame, an OFDM symbol index in a slot, a CP length, etc. at the start of each OFDM symbol.

If a system has a bandwidth smaller than $N^{max,DL}$, a certain portion of an RS sequence generated to have a length of $2 \times N^{max,DL}$ can be selected to be used.

Now, a dedicated RS will be described.

Figure 12:
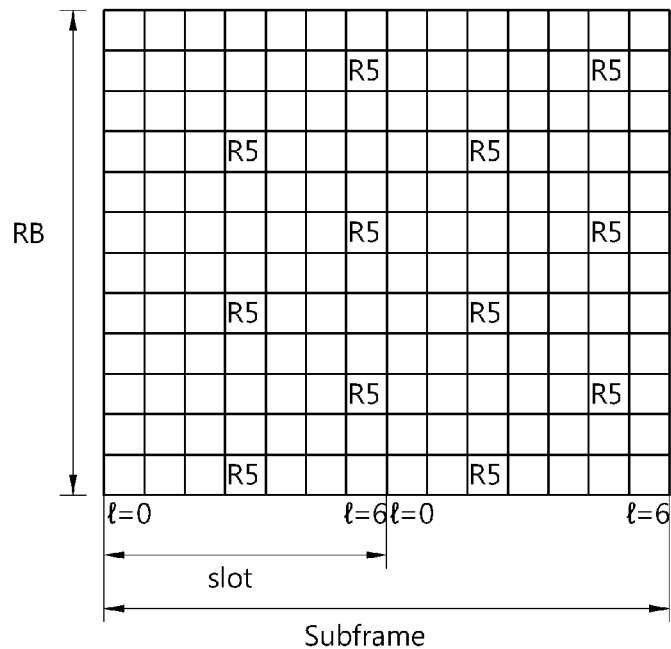
FIG. 12 shows an example of a dedicated RS structure if a normal cyclic prefix (CP) is used.

FIG. 12 shows an example of a dedicated RS structure if a normal CP is used. 1 TTI has 14 OFDM symbols if using the normal CP. Hereinafter, R5 denotes a reference symbol of an antenna 5 which transmits a dedicated RS. In one OFDM symbol including reference symbols, the reference symbols are located with a spacing of 4 subcarriers.

Figure 13:
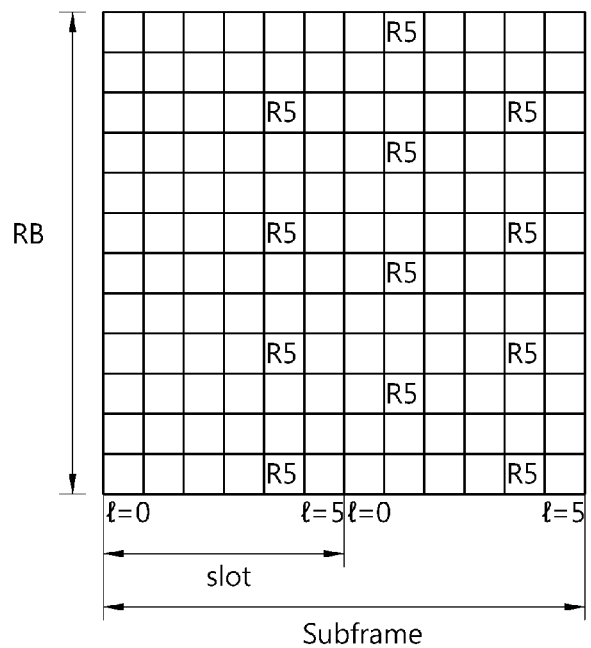
FIG. 13 shows an example of a dedicated RS structure if an extended CP is used.

FIG. 13 shows an example of a dedicated RS structure if an extended CP is used. 1 TTI has 12 OFDM symbols if using the extended CP. In one OFDM symbol including reference symbols, the reference symbols are located with a spacing of 3 subcarriers.

The number of transmitted dedicated RSs is equal to the number of streams. The dedicated RS can be used if a BS transmits downlink information to a specific UE by beamforming. The dedicated RS can be transmitted using a RB to which a PDSCH is mapped. The information about the RB mapped with the PDSCH can be transmitted on a PDCCH. The BS transmits downlink information to the specific UE on the PDSCH.

A frequency-domain position and a time-domain position of the dedicated RS in a subframe can be determined according to a RB allocated for PDSCH transmission. A dedicated RS sequence to be multiplied by the dedicated RS can be determined according to a UE ID. In this case, only the specific UE corresponding to the UE ID in a cell can receive the dedicated RS. Therefore, the dedicated RS is also referred to as a UE-specific RS.

More specifically, the time-domain position of the dedicated RS in a subframe may be determined according to a slot number in a radio frame and a CP length. The frequency-domain position of the dedicated RS in the subframe may be determined according to a RB allocated for PDSCH transmission, a cell ID, an OFDM symbol index l, a CP length, etc.

A dedicated RS sequence can be applied in one subframe on an OFDM symbol basis. The dedicated RS sequence may differ according to a cell ID, a subframe position in a radio frame, a UE ID, etc.

Equations 3 and 4 can be also applied in the dedicated RS sequence.

In Equation 3, m is determined by $N^{PDSCH}$. $N^{PDSCH}$ denotes the number of RBs corresponding to a bandwidth in association with PDSCH transmission. Therefore, a length of the dedicated RS sequence may vary depending on $N^{PDSCH}$. That is, the RS sequence has a different length according to a data amount allocated to the UE. In Equation 4, a 1st m-sequence $x_1(i)$ or a 2nd m-sequence $x_2(i)$ can be initialized according to a cell ID, a subframe position in one radio frame, a UE ID, etc at the start of each subframe.

The dedicated RS sequence is generated for each subframe, and can be applied on an OFDM symbol basis. Referring to FIGS. 12 and 13, the number of reference symbols is 12 in a resource region consisting of one subframe in a time domain and one RB in a frequency domain. Since the number of RBs is $N^{PDSCH}$, the number of all reference symbols is $12 \times N^{PDSCH}$. Therefore, the dedicated RS sequence has a length of $12 \times N^{PDSCH}$. If the dedicated RS sequence is generated using Equation 3, m is 0, 1, . . . , $12N^{PDSCH}-1$. The dedicated RS sequences are sequentially mapped to the reference symbols. First, the dedicated RS sequences are mapped to the reference symbols in one OFDM symbol in an ascending order of a subcarrier index, and are then mapped to next OFDM symbol.

The common RS and the dedicated RS can be simultaneously used. For example, it is assumed that control information is transmitted on 3 OFDM symbols (l=0, 1, 2) of a 1st slot in a subframe. In OFDM symbols indexed with 0, 1, and 2 (l=0, 1, 2), the common RS may be used. In the remaining OFDM symbols other than the 3 OFDM symbols, the dedicated RS may be used.

Since the number of transmitted dedicated RSs is equal to the number of streams, only one stream can be transmitted according to the dedicated RS structure of FIGS. 12 and 13. In addition, since the aforementioned dedicated RS structure cannot be simply extended, a plurality of streams cannot be transmitted. This results in decrease in efficiency of a multiple antenna system capable of transmitting a plurality of streams. Therefore, there is a need for a method for effectively transmitting a dedicated RS and capable of transmitting a plurality of streams in a multiple antenna system.

If using the multiple antenna system, data can be recovered only if an RS for each antenna is identifiable. To avoid interference between RSs for respective antennas, frequency division multiplexing (FDM), time division multiplexing (TDM), or code division multiplexing (CDM) can be used. In the FDM, an RS for each antenna is transmitted by being divided in a frequency domain. In the TDM, the RS for each antenna is transmitted by being divided in a time domain. In the CDM, the RS for each antenna is transmitted by using a different sequence. If the FDM and TDM are used to transmit RSs through multiple antennas, reference symbols for each antenna do not overlap with one another. If the CDM is used, resource elements used for transmission of an RS for each antenna may overlap with one another. Therefore, if the CDM is used, a plurality of streams can be transmitted without changing a dedicated RS structure.

Hereinafter, a method for transmitting a RS and capable of transmitting a plurality of streams by using CDM in a multiple antenna system will be described.

Figure 14:
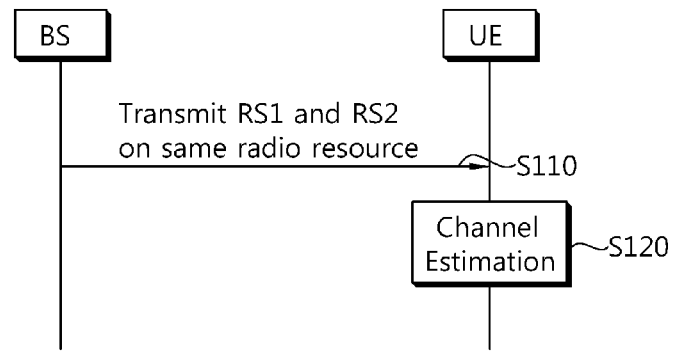
FIG. 14 is a flow diagram showing an example of a method for transmitting an RS in a multiple antenna system.

FIG. 14 is a flow diagram showing an example of a method for transmitting a RS in a multiple antenna system.

Referring to FIG. 14, a BS transmits a 1st reference signal (RS1) for a 1st stream through a 1st antenna and transmits a 2nd reference signal (RS2) for a 2nd stream through a 2nd antenna by using the same radio resource (step S110). The RS1 may be generated based on a 1st sequence, and the RS2 may be generated based on a 2nd sequence. A UE estimates a channel in accordance with the RS1 and the RS2 (step S120).

As such, by using the CDM, a resource element used as a reference symbol of one stream can be multiplexed with a reference symbol of another stream. The RS1 for the 1st stream may be generated based on the 1st sequence, and the RS2 for the 2nd steam may be generated based on the 2nd sequence orthogonal to the 1st sequence. If the 1st sequence and the 2nd sequence are orthogonal to each other, the UE can recover the 1st sequence and the 2nd sequence without interference. Therefore, if using N streams (where N is a natural number greater than or equal to 2), N orthogonal sequences can be used for an RS for each stream. Accordingly, at each OFDM symbol including reference symbols, RSs for all streams can be simultaneously transmitted. In addition, the 2nd sequence may use a sequence having a low correlation with the 1st sequence.

If the 1st sequence and the 2nd sequence are orthogonal to each other, any sequence can be used as the 1st sequence and the 2nd sequence. In general, an RS sequence is a random sequence. Hereinafter, the 1st sequence is referred to as a pseudo-random (PN) sequence. For example, the 2nd sequence may be obtained by cyclic shifting or delaying the PN sequence in a time domain. If a cyclic shifting is performed in the time domain, the 2nd sequence may be configured in a form in which the PN sequence is multiplied by a phase shift sequence in a frequency domain. The phase shift sequence is hereinafter referred to as an orthogonal sequence (OS).

The 1st sequence may be the RS sequence of Equation 3. If $r_i(m)$ denotes the 2nd sequence obtained by cyclic shifting the RS sequence r(m), $r_i(m)$ can be expressed by the following equation.

MathFigure 5

$$r_i(m) = r(m)e^{-j\theta_i m} \quad [\text{Math.5}]$$

Herein, i=1, 2, . . . , N (where N is a natural number). N 2nd sequences can be generated according to i. N may differ according to a channel condition. $\theta_i$ is a cyclic shift value, and can be expressed by the following equation for example.

MathFigure 6

$$\theta_i = \frac{2\pi(i-1)}{N} \quad [\text{Math. 6}]$$

If $\theta_i$ is 0, the 2nd sequence is identical to the 1st sequence. That is, an RS sequence used for an RS is a two-layered sequence which is obtained by multiplying the PN sequence by the OS. Hereinafter, 'PN+OS' denotes an RS sequence obtained by multiplying the PN sequence by the OS. For example, 'PN0+OS0' and 'PN0+OS1' are obtained by applying different cyclic shifting to the same PN sequence, and are orthogonal to each other. That is, orthogonal RS sequences can be generated by multiplying the same PN sequence by different OSs. The PN sequence may change according to an OFDM symbol position. The RS sequence may be obtained by cyclic shifting a changed PN sequence.

The cyclic shift value $\theta_i$ has a sufficient interval to identify an impulse response of a channel for each antenna. It is assumed that a wireless communication system operates in a channel environment where an effective OFDM symbol length is 66.7 μs, and a maximum delay spread is 5 μs. In this case, a cyclic shift value is provided at least every 5 μs. Therefore, 12 cyclic shifts can be identified. If reference symbols are located with a spacing of 4 subcarriers in one OFDM symbol, the number of available cyclic shifts is decreased by 4-fold. That is, the number of cyclic shift values may be 12/4=3. If reference symbols are located with a spacing of 3 subcarriers in one OFDM symbol, the number of available cyclic shifts is decreased by 3-fold, and thus the number of cyclic shift values is 12/3=4.

For convenience of explanation, terminologies are defined as follows again. Px denotes an OFDM symbol including reference symbols in one subframe. Sx denotes an RS sequence for an xth stream. That is, the Sx is an RS sequence for an antenna x that transmits the xth stream. The Sx is a two-layered sequence obtained by multiplying a PN sequence by an OS. The Sx can be extended to the concept of an RS sequence for a cell x.

Figure 15:
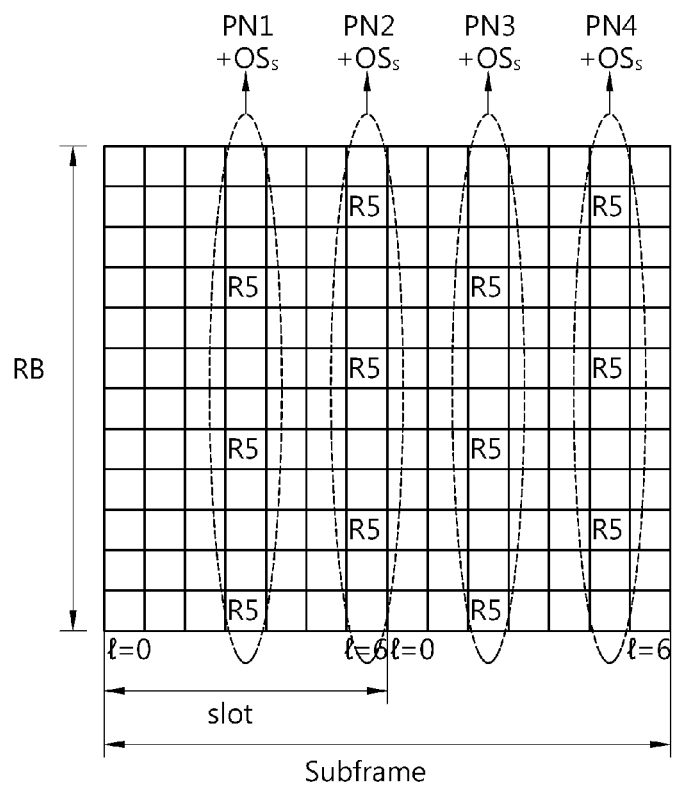
FIG. 15 shows an example of an RS structure using code division multiplexing (CDM) if a normal CP is used.

FIG. 15 shows an example of an RS structure using CDM if a normal CP is used.

Referring to FIG. 15, in one subframe, the number of OFDM symbols including reference symbols is 4. P1 is an OFDM symbol indexed with 3(l=3) in a 1st slot of the subframe. P2 is an OFDM symbol indexed with 6(l=6) in the 1st slot of the subframe. P3 is an OFDM symbol indexed with 2(l=2) in a 2nd slot of the subframe. P4 is an OFDM symbol indexed with 5(l=5) in the 2nd slot of the subframe. An RS sequence using cyclic shifting for each Px(x=1, 2, 3, 4) can be used.

If 4 streams are transmitted, 4 orthogonal RS sequences are required for each stream.

The following table shows an example of an RS structure with respect to 4 streams.

TABLE 1

|    | P1        | P2        | P3        | P4        |
|----|-----------|-----------|-----------|-----------|
| S1 | PN1 + OS0 | PN2 + OS0 | PN3 + OS0 | PN4 + OS0 |
| S2 | PN1 + OS1 | PN2 + OS1 | PN3 + OS1 | PN4 + OS1 |
| S3 | PN1 + OS2 | PN2 + OS2 | PN3 + OS2 | PN4 + OS2 |
| S4 | PN1 + OS3 | PN2 + OS3 | PN3 + OS3 | PN4 + OS3 |

Each of RS sequences S1, S2, S3, and S4 for respective 4 streams is generated by multiplying a PN sequence by each of 4 OSs. PN1, PN2, PN3, and PN4 may be either different PN sequences or identical PN sequences.

Accordingly, high channel estimation performance can be obtained in a fast time selective channel. Whether it is the time selective channel or a time flat channel can be known by using a coherence time. The coherent time is inversely proportional to a Doppler spread. In general, if a UE moves with a high speed, a wireless communication environment is the time selective channel.

According to the number of cyclic shift values, the maximum number of transmittable streams is limited. The number of cyclic shift values is also limited. In order to transmit more streams by fully utilizing the limited number of cyclic shift values, an RS for a specific stream may be transmitted only in some OFDM symbols among a plurality of OFDM symbols including reference symbols in a subframe. That is, at an OFDM symbol including reference symbols, RSs for all streams are not transmitted.

The following table shows another example of an RS structure with respect to 4 streams.

TABLE 2

|    | P1        | P2        | P3        | P4        |
|----|-----------|-----------|-----------|-----------|
| S1 | PN1 + OS0 | —         | PN3 + OS0 | —         |
| S2 | PN1 + OS1 | —         | PN3 + OS1 | —         |
| S3 | —         | PN2 + OS0 | —         | PN4 + OS0 |
| S4 | —         | PN2 + OS1 | —         | PN4 + OS1 |

S1 and S2 are transmitted only through P1 and P3. S3 and S4 are transmitted only through P2 and P4. The number of RSs simultaneously transmitted using the CDM is 2. Therefore, RSs for the 4 streams can be transmitted using two cyclic shift values. A combination of Px, Sx, and an RS sequence shown in the above table can have various forms. In addition, the number of RSs simultaneously transmitted using the CDM may also vary.

Figure 16:
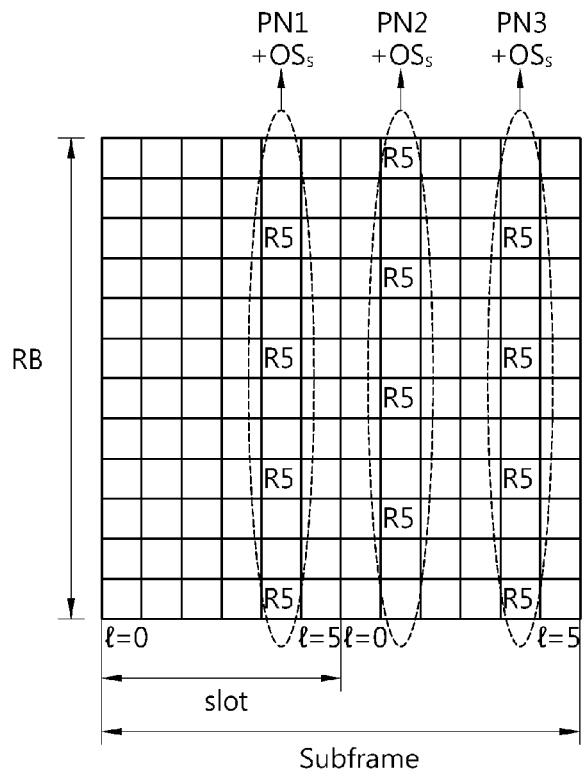
FIG. 16 shows an example of an RS structure using CDM if an extended CP is used.

FIG. 16 shows an example of an RS structure using CDM if an extended CP is used.

Referring to FIG. 16, in one subframe, the number of OFDM symbols including reference symbols is 3. P1 is an OFDM symbol indexed with 4(l=4) in a 1st slot of the subframe. P2 is an OFDM symbol indexed with 1(l=1) in a 2nd slot of the subframe. P3 is an OFDM symbol indexed with 4(l=4) in the 2nd slot of the subframe. An RS sequence using cyclic shifting for each Px(x=1, 2, 3) is used.

If 4 streams are transmitted, 4 orthogonal RS sequences are required for each stream.

The following table shows an example of an RS structure with respect to 4 streams.

TABLE 3

|    | P1        | P2        | P3        |
|----|-----------|-----------|-----------|
| S1 | PN1 + OS0 | PN2 + OS0 | PN3 + OS0 |
| S2 | PN1 + OS1 | PN2 + OS1 | PN3 + OS1 |
| S3 | PN1 + OS2 | PN2 + OS2 | PN3 + OS2 |
| S4 | PN1 + OS3 | PN2 + OS3 | PN3 + OS3 |

Each of RS sequences S1, S2, S3, and S4 for respective 4 streams is generated by multiplying a PN sequence by each of 4 OSs. PN1, PN2, PN3, and PN4 may be either different PN sequences or identical PN sequences.

In order to transmit more streams by fully utilizing the limited number of cyclic shift values, an RS for a specific stream may be transmitted only in some OFDM symbols among a plurality of OFDM symbols including reference symbols in a subframe.

The following table shows another example of an RS structure with respect to 4 streams.

TABLE 4

|    | P1        | P2        | P3        |
|----|-----------|-----------|-----------|
| S1 | PN1 + OS0 | PN2 + OS0 | PN3 + OS0 |
| S2 | PN1 + OS1 | PN2 + OS1 | —         |
| S3 | PN1 + OS2 | —         | PN3 + OS1 |
| S4 | —         | PN2 + OS2 | PN3 + OS2 |

S1 is transmitted through P1, P2, and P3. S2 is transmitted only through P1 and P2. S3 is transmitted only through P1 and P3. S4 is transmitted only through P2 and P3. The number of RSs simultaneously transmitted using the CDM is 3. Therefore, an RS for the 4 streams can be transmitted using 3 cyclic shift values. A combination of Px, Sx, and an RS sequence shown in the above table can have various forms. In addition, the number of RSs simultaneously transmitted using the CDM may also vary.

A case where an RS sequence is used on an OFDM symbol basis has been described up to now. For example, m of the RS sequence of Equation 5 is sequentially mapped to a reference symbol in an ascending order of a subcarrier index in one OFDM symbol.

However, an RS sequence can be used by combining a plurality of OFDM symbols including reference symbols. However, this method can be used under the assumption that a channel is almost not changed during a corresponding duration. This is because channel estimation performance may be decreased in a time selective channel in which Doppler spread is significant.

Figure 17:
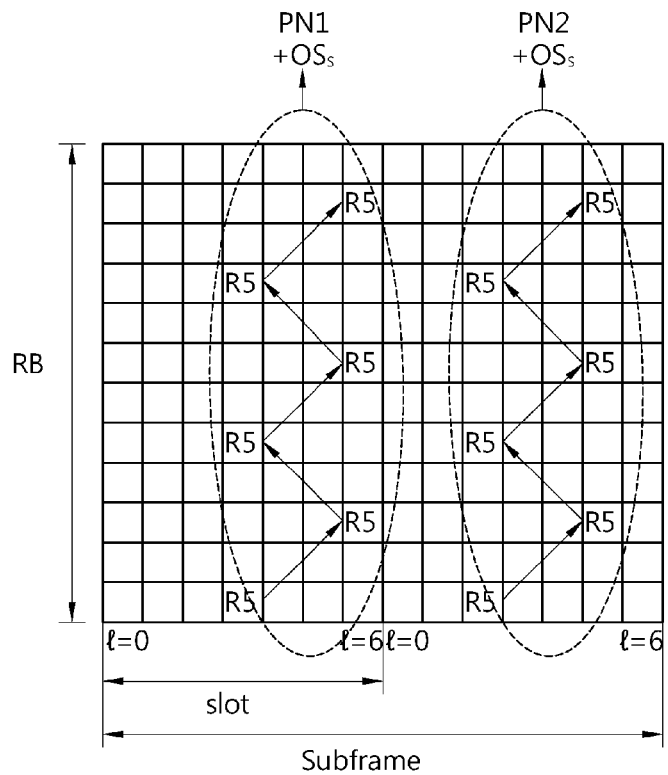
FIG. 17 shows another example of an RS structure using CDM if a normal CP is used.

FIG. 17 shows another example of an RS structure using CDM if a normal CP is used.

Referring to FIG. 17, an RS sequence is applied by pairing two OFDM symbols including reference symbols in a subframe. OFDM symbols indexed with 3 and 6(l=3, 6) are paired in a 1st slot of the subframe. OFDM symbols indexed with 2 and 5(l=2, 5) are paired in a 2nd slot of the subframe. In this case, the RS structure may have the same format in which reference symbols are inserted with a spacing of two subcarriers. Therefore, the number of cyclic shift values can be 12/2=6. That is, the number of cyclic shift values is increased and thus many different orthogonal RS sequences can be generated.

For example, the RS sequences of Equation 5 are sequentially mapped alternately to two paired OFDM symbols. That is, in a 1st OFDM symbol of the two paired OFDM symbols, m of an RS sequence increases linearly by an even number. In a 2nd OFDM symbol of the two paired OFDM symbols, m of the RS sequence increases linearly by an odd number.

In channel estimation, a UE performs decoding by combining reference symbols received through the two paired OFDM symbols. The UE receives an RS repetitively twice.

The following table shows an example of an RS structure with respect to 4 streams.

TABLE 5

|    | P1        | P2 | P3        | P4 |
|----|-----------|----|-----------|----|
| S1 | PN1 + OS0 |    | PN2 + OS0 |    |
| S2 | PN1 + OS1 |    | PN2 + OS1 |    |
| S3 | PN1 + OS2 |    | PN2 + OS2 |    |
| S4 | PN1 + OS3 |    | PN2 + OS3 |    |

P1 and P2 are paired, and P3 and P4 are paired. Each of RS sequences S1, S2, S3, and S4 for respect 4 streams is generated by multiplying a PN sequence by each of 4 OSs. Each of the RS sequences for the respective streams is mapped alternately to two paired OFDM symbols.

In order to transmit more streams by fully utilizing the limited number of cyclic shift values, an RS for a specific stream may be transmitted only in some OFDM symbols among a plurality of paired OFDM symbols in a subframe. In this case, transmission may be unevenly achieved such that one stream is transmitted in all paired OFDM symbols in the subframe and another stream is transmitted only in some paired OFDM symbols.

The following table shows another example of an RS structure with respect to 4 streams.

TABLE 6

|    | P1        | P2 | P3        | P4 |
|----|-----------|----|-----------|----|
| S1 | PN1 + OS0 |    | PN2 + OS0 |    |
| S2 | PN1 + OS1 |    | PN2 + OS1 |    |
| S3 | PN1 + OS2 |    | —         |    |
| S4 | —         |    | PN2 + OS3 |    |

S1 and S2 are transmitted through paired P1 and P2, and paired P3 and P4. S3 is transmitted through only paired P1 and P2. S4 is transmitted through only paired P3 and P4. In case of S1 and S2, the number of transmitted reference symbols is identical at each OFDM symbol including reference symbols, and thus even power transmission is possible for each stream. If the number of streams increases, it is possible to transmit S3 and S4 with less Tx power.

Figure 18:
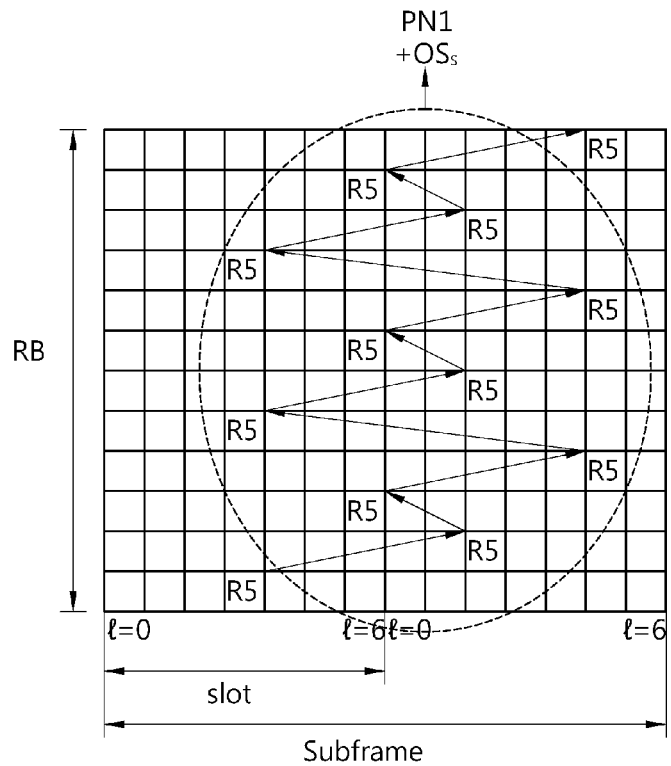
FIG. 18 shows still another example of an RS structure using CDM if a normal CP is used.

FIG. 18 shows still another example of an RS structure using CDM if a normal CP is used. In FIG. 18, reference symbols included OFDM symbol indices 2 and 5 (l=2, 5) of the 2nd slot in the subframe of FIG. 12 are shifted by one subcarrier.

Referring to FIG. 18, an RS sequence is applied by combining all OFDM symbols including reference symbols in the subframe. In this case, the RS structure may have a format in which reference symbols are inserted in every subcarrier. Therefore, the number of cyclic shift values can be 12. That is, the number of cyclic shift values increases, and thus a more number of different orthogonal RS sequences can be generated. Since up to 12 RS sequences can be used, a cyclic shift value can be properly used according to the number of streams.

For example, in 4 OFDM symbols sequentially combined, the RS sequences of Equation 5 are mapped to reference symbols in an ascending order of a subcarrier index. That is, m of the RS sequence in the combined OFDM symbols increases linearly in an arrow direction.

The following table shows an example of an RS structure with respect to 12 streams.

TABLE 7

| | P1 | P2 | P3 | P4 |
|---|---|---|---|---|
| S1 | | PN1 + OS0 | | |
| S2 | | PN1 + OS1 | | |
| . | | . | | |
| . | | . | | |
| . | | . | | |
| S12 | | PN1 + OS11 | | |

Each of RS sequences S1, S2, . . . , S12 for respective 12 streams is generated by multiplying a PN sequence by each of 12 OSs. Herein, a cyclic shift value $\theta_x$ of OSx may increase linearly in accordance with the increase of x, or may have a random value.

In case of using an extended CP, an RS sequence can also be applied by combining a plurality of OFDM symbols including reference symbols. However, since the number of OFDM symbols including reference symbols in a subframe is 3 if using the extended CP, it is difficult to apply the RS sequence by paring two OFDM symbols.

Figure 19:
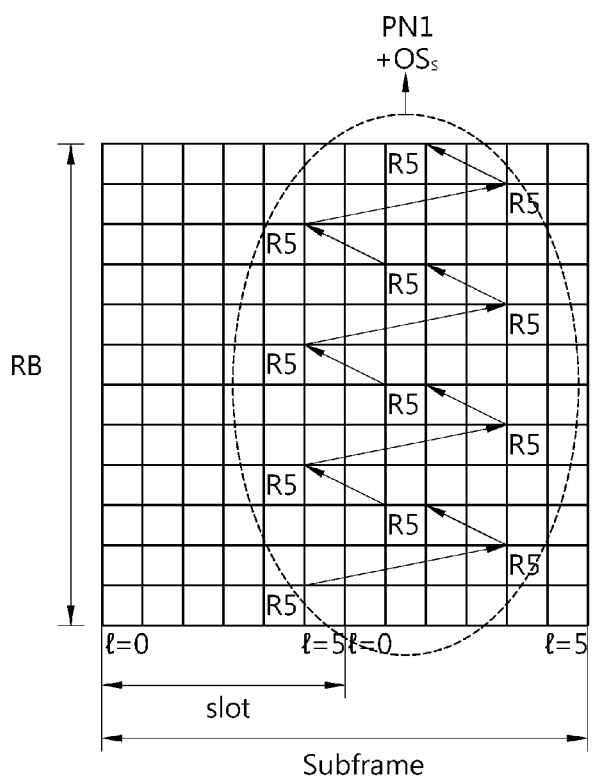
FIG. 19 shows another example of an RS structure using CDM if an extended CP is used.

FIG. 19 shows another example of an RS structure using CDM if an extended CP is used. In FIG. 19, reference symbols included an OFDM symbol index 4(l=4) of the 2nd slot in the subframe of FIG. 13 is shifted by one subcarrier.

Referring to FIG. 19, an RS sequence is applied by combining all OFDM symbols including reference symbols in the subframe. In this case, the RS structure may have a format in which reference symbols are inserted in every subcarrier. Therefore, the number of cyclic shift values can be 12.

Although only P3 is shifted in a frequency domain, P1, P2, and/or P3 can be simultaneously shifted if reference symbols are inserted in every subcarrier. In addition, an index of an OFDM symbol including reference symbols in a subframe can also be changed.

The following table shows an example of an RS structure with respect to 12 streams.

TABLE 8

| | P1 | P2 | P3 |
|---|---|---|---|
| S1 | | PN1 + OS0 | |
| S2 | | PN1 + OS1 | |
| . | | . | |
| . | | . | |
| . | | . | |
| S12 | | PN1 + OS11 | |

Each of RS sequences S1, S2, . . . , S12 for respective 12 streams is generated by multiplying a PN sequence by each of 12 OSs. Herein, a cyclic shift value $\theta_x$ of OSx may increase linearly in accordance with the increase of x, or may have a random value.

The aforementioned RS structure using the CDM can be further extended by using an orthogonal code. For example, the orthogonal code may be a Walsh code, a discrete Fourier transform (DFT) code, etc.

In case of using a normal CP, the number of OFDM symbols including reference symbols in one subframe is 4. In this case, a 4×4 Walsh code or a 4×4 DFT code can be used. Accordingly, the number of RS sequences can be increased by up to 4-fold.

Figure 20:
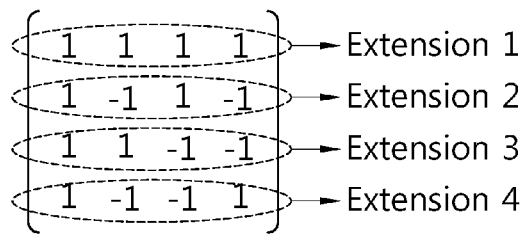
FIG. 20 shows an example of a Walsh code.

FIG. 20 shows an example of a Walsh code.

Referring to FIG. 20, each column of a 4×4 Walsh code is multiplied by 1st, 2nd, 3rd, and 4th OFDM symbols among 4 OFDM symbols including reference symbols. Each extension has a 'PN+OS' group described in the above tables.

If an extended CP is used, an RS structure using CDM can be further extended by using an orthogonal code, similarly to the case of using a normal CP. If the extended CP is used, the number of OFDM symbols including reference symbols in one subframe is 3. In this case, a 3×3 Walsh code or a 3×3 DFT code can be used. Accordingly, the number of RS sequences can be increased by up to 3-fold.

If RSs for respective multiple antennas that transmit a plurality of streams are multiplexed using the CDM, power used before multiplexing can be evenly distributed to be used. However, if a receiver cannot support an RS structure using the CDM, power of the RS is halved and thus channel estimation performance may significantly decrease. Accordingly, it is need to control power of each antenna's RS multiplexed using the CDM. A 1st sequence multiplexed with a 2nd sequence on the same resource element may have a different power ratio. The 1st sequence is a PN sequence, and the 2nd sequence is obtained by cyclic shifting the 1st sequence in a time domain. For example, power of a specific antenna may be controlled so that the specific antenna has a robust channel estimation performance. In addition, RS power of an antenna using the 2nd sequence obtained by cyclic shifting the 1st sequence may be set to a relatively small value.

A signal received in one resource element can be expressed by the following equation.

MathFigure 7

$$\tilde{r}(m) = h_1\sqrt{\alpha} \cdot r(m)e^{-j0} + h_2\sqrt{1-\alpha} \cdot r(m)e^{-j\theta_i m} \quad \text{[Math.7]}$$

Herein, $h_1$ and $h_2$ each denotes a channel, and $\alpha$ denotes a power control factor. If total Tx power is 1, $\alpha$ satisfies $0 \leq \alpha \leq 1$. If $\alpha = 0.5$, the 1st and 2nd sequences multiplexed using the CDM have the same power. By regulating $\alpha$, power of an RS sequence for each antenna can be regulated.

Figure 21:
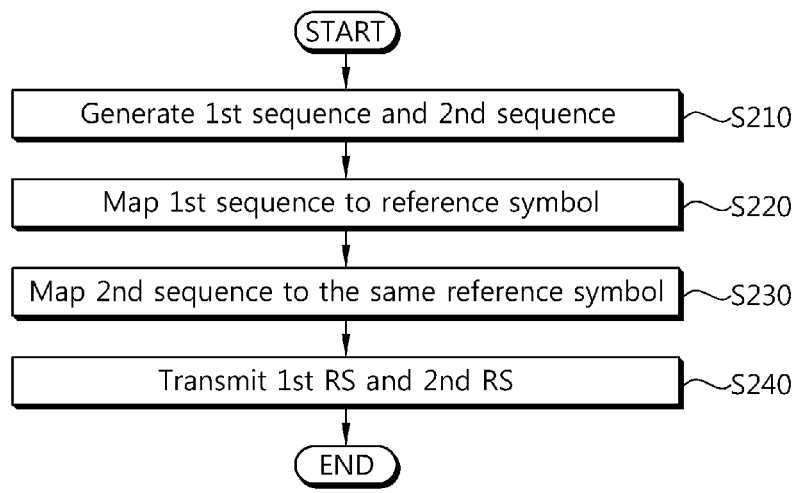
FIG. 21 is a flow chart diagram showing a method of transmitting an RS according to an embodiment of the present invention.

FIG. 21 is a flow chart diagram showing a method of transmitting an RS according to an embodiment of the present invention. The method is carried in a transmitter. The transmitter may be a part of a BS or a part of a UE.

Referring to FIG. 21, the transmitter generates a first sequence and a second sequence (step S210). The transmitter maps the first sequence to reference symbols in a resource block (step S220). The transmitter maps the second sequence to the same reference symbols in the resource block (step S230). The transmitter transmits a first RS based on the first sequence through a first antenna, and a second RS based on the second sequence through a second antenna (step S240). The reference symbols are resource elements of a specific position in the resource block.

The second sequence may be generated by cyclic shifting the first sequence in a time domain. Otherwise, the second sequence may be generated by multiplying the first sequence by a phase shift in a frequency domain. The second sequence may be orthogonal to the first sequence.

Each of the first RS and the second RS may be transmitted to at least one user equipment in a cell. The each of the first RS and the second RS is generated based on an ID of the at least one user equipment. The each of the first RS and the second RS is transmitted in the resource block to which a PDSCH is mapped, and information regarding the resource block to which the PDSCH is mapped is carried on a PDCCH.

Each of the first sequence and the second sequence may be mapped to first reference symbols included the reference symbols on a subcarrier basis in one OFDM symbol in the resource block, and is then mapped to second reference symbols included the reference symbols on a subcarrier basis in a next OFDM symbol.

Otherwise, the each of the first sequence and the second sequence may be mapped to the reference symbols on a subcarrier basis throughout a plurality of OFDM symbols in the resource block. Contiguous elements among all elements constituting the each of the first sequence and the second sequence may be mapped to different OFDM symbols. The elements to be mapped to the same OFDM symbol among elements constituting the each of the first sequence and the second sequence may be spaced apart by a specific subcarrier spacing.

Figure 22:
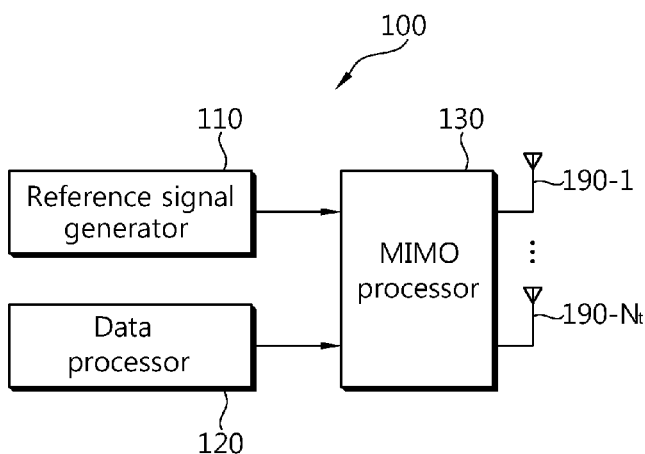
FIG. 22 is a block diagram showing an example of a transmitter using multiple antennas.

FIG. 22 is a block diagram showing an example of a transmitter using multiple antennas. The transmitter may be a part of a BS or a part of a UE.

Referring to FIG. 22, a transmitter 100 includes a reference signal generator 110, a data processor 120, and a MIMO processor 130.

The reference signal generator 110 generates a RS as described up to now. The data processor 120 generates a data symbol by performing data processing. For example, data processing includes channel coding, modulation, etc. The MIMO processor 130 processes a data symbol and a RS according to a MIMO scheme depending on Tx antennas 190-1, . . . , 190-Nt. The data symbol and the RS are mapped to resource elements for each of the Tx antennas 190-1, . . . , 190-Nt, and then an OFDM symbol is generated. The generated OFDM signal is transmitted on each of the Tx antennas 190-1, . . . , 190-Nt.

Figure 23:
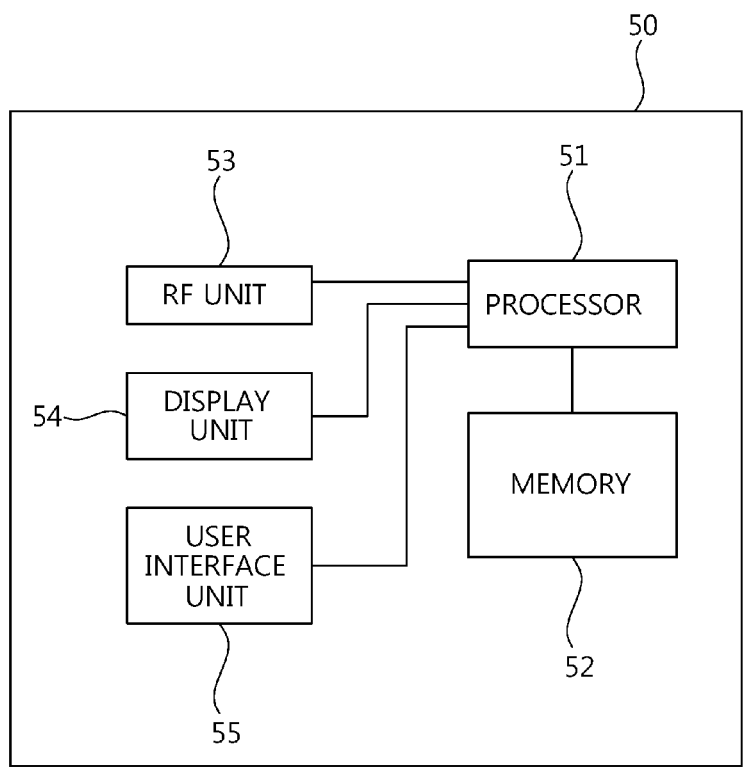
FIG. 23 is a block diagram showing an apparatus for a wireless communication.

FIG. 23 is a block diagram showing an apparatus for a wireless communication. The apparatus may be a part of a UE. An apparatus 50 includes a processor 51, a memory 52, a radio frequency (RF) unit 53, a display unit 54, and a user interface unit 55. The processor 51 may be configured to implement proposed functions, procedures and/or methods described in this description. Layers of the radio interface protocol may be implemented in the processor 51. The processor 51 may provide the control plane and the user plane. The function of each layer can be implemented in the processor 51. The memory 52 is operatively coupled with the processor 51 and stores a variety of information to operate the processor 51 (e.g., an operating system, applications, and general files). The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is operatively coupled with the processor 51 and transmits and/or receives radio signals.

The processor 51 may include application-specific integrated circuit (ASIC), other chipset, logic circuit, data processing device and/or converter which converts a baseband signal into a radio signal and vice versa. The memory 52 may include read-only memory (ROM), random access memory (RAM), flash memory, memory card, storage medium and/or other storage device. The RF unit 53 includes one or more antennas which transmit and/or receive a radio signal. When the embodiments are implemented in software, the techniques described herein can be implemented with modules (e.g., procedures, functions, and so on) that perform the functions described herein. The modules can be stored in memory 52 and executed by processor 51. The memory 52 can be implemented within the processor 51 or external to the processor 51 in which case those can be communicatively coupled to the processor 51 via various means as is known in the art.

The aforementioned methods can be differently applied according to a Tx antenna scheme or a Tx channel. For example, it is assumed that a channel is changed from a time selective channel, in which channel property changes rapidly over time, to a time flat channel. In the time selective channel, an open-loop Tx antenna scheme is used to transmit a RS according to the method of FIGS. 15 and 16. In the time flat channel, a closed-loop Tx antenna scheme can be used to increase the number of cyclic shift values according to the methods of FIGS. 17 to 19. The aforementioned methods can be differently applied according to a time domain or a frequency domain, and they can also be differently applied according to a UE type or a BS. These methods can also be applied not only for a dedicated RS structure but also for a method of extending a common RS. Although the aforementioned RS structure is based on downlink communication, it can also be applied to uplink communication.

As such, a method and an apparatus for effectively transmitting a reference signal in a wireless communication system are provided. In an RS structure using CDM, different antennas can transmit respective RSs for a plurality of streams by using the same resource element. That is, the number of transmittable streams can be increased without increasing an RS overhead. Therefore, a method for effectively transmitting a dedicated RS and capable of transmitting a plurality of streams in a multiple antenna system can be provided. Accordingly, overall system performance can be improved. Moreover, the present invention may have unexpected advantages or effects when those having ordinary skill in the art practices the invention.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. For example, those skilled in the art can combine the elements provided at different embodiments of the present invention. Thus, it is intended that the present invention covers the modifications and variations of this invention provided they come within the scope of protection.

The invention claimed is:

1. A method for transmitting a reference signal in a wireless communication system, carried in a transmitter, the method comprising:
   generating a first sequence and a second sequence;
   mapping the first sequence to reference symbols in a resource block;
   mapping the second sequence to the same reference symbols in the resource block; and
   transmitting a first reference signal (RS) based on the first sequence through a first antenna, and a second RS based on the second sequence through a second antenna,
   wherein the resource block consists of a plurality of orthogonal frequency division multiplexing (OFDM) symbols and a plurality of subcarriers, each element of the resource block is a resource element, and the reference symbols are resource elements of a specific position in the resource block, and
   wherein each of the first sequence and the second sequence is mapped to first reference symbols included the reference symbols on a subcarrier basis in one OFDM symbol in the resource block, and is then mapped to second reference symbols included the reference symbols on a subcarrier basis in a next OFDM symbol.

2. The method of claim 1, wherein each of the first RS and the second RS is transmitted to at least one user equipment in a cell.

3. The method of claim 2, wherein the each of the first RS and the second RS is generated based on an identifier (ID) of the at least one user equipment.

4. The method of claim 1, wherein the second sequence is generated by cyclic shifting the first sequence in a time domain.

5. The method of claim 1, wherein the second sequence is generated by multiplying the first sequence by a phase shift in a frequency domain.

6. The method of claim 1, wherein the second sequence is orthogonal to the first sequence.

7. A method for transmitting a reference signal in a wireless communication system, carried in a transmitter, the method comprising:
   generating a first sequence and a second sequence;
   mapping the first sequence to reference symbols in a resource block;
   mapping the second sequence to the same reference symbols in the resource block; and
   transmitting a first reference signal (RS) based on the first sequence through a first antenna, and a second RS based on the second sequence through a second antenna,
   wherein the resource block consists of a plurality of orthogonal frequency division multiplexing (OFDM) symbols and a plurality of subcarriers, each element of the resource block is a resource element, and the reference symbols are resource elements of a specific position in the resource block,
   wherein each of the first sequence and the second sequence is mapped to the reference symbols on a subcarrier basis throughout a plurality of OFDM symbols in the resource block, and
   wherein contiguous elements among all elements constituting the each of the first sequence and the second sequence are mapped to different OFDM symbols.

8. A method for transmitting a reference signal in a wireless communication system, carried in a transmitter, the method comprising:
   generating a first sequence and a second sequence;
   mapping the first sequence to reference symbols in a resource block;
   mapping the second sequence to the same reference symbols in the resource block; and
   transmitting a first reference signal (RS) based on the first sequence through a first antenna, and a second RS based on the second sequence through a second antenna,
   wherein the resource block consists of a plurality of orthogonal frequency division multiplexing (OFDM) symbols and a plurality of subcarriers, each element of the resource block is a resource element, and the reference symbols are resource elements of a specific position in the resource block,
   wherein each of the first RS and the second RS is transmitted to at least one user equipment in a cell, and
   wherein the each of the first RS and the second RS is transmitted in the resource block to which a physical downlink shared channel (PDSCH) is mapped, and information regarding the resource block to which the PDSCH is mapped is carried on a physical downlink control channel (PDCCH).

* * * * *